United States Patent [19]

Kitayama et al.

[11] Patent Number: 5,430,977
[45] Date of Patent: Jul. 11, 1995

[54] STRUCTURE AND METHOD OF MOUNTING WINDOW REGULATOR

[75] Inventors: Kenichi Kitayama; Yujiro Tashima, both of Wako, Japan

[73] Assignee: Honda Giken Kogyo Kabushiki Kaisha, Tokyo, Japan

[21] Appl. No.: 291,953

[22] Filed: Aug. 17, 1994

[30] Foreign Application Priority Data

Aug. 31, 1993 [JP] Japan .................. 5-237282

[51] Int. Cl.[6] .............................................. B60J 5/04
[52] U.S. Cl. .......................................... 49/502; 49/166; 49/352; 49/506
[58] Field of Search ............... 49/502, 352, 506, 166, 49/348, 349, 350, 351

[56] References Cited

U.S. PATENT DOCUMENTS

| 4,658,546 | 4/1987 | Moriyama | 49/352 |
| 4,956,942 | 9/1990 | Lisak et al. | 49/502 |
| 4,995,568 | 2/1991 | Yamagishi et al. | 49/352 X |
| 5,038,519 | 8/1991 | Huebner | 49/352 X |

*Primary Examiner*—Philip C. Kannan
*Attorney, Agent, or Firm*—Armstrong, Westerman, Hattori, McLeland & Naughton

[57] ABSTRACT

Disclosed is a structure for mounting a window regulator in which a guide rail is fixedly mounted by a plurality of bolts to a door inner panel, and a door window is supported and bolted from below by a sliding support member which slides along the guide rail, to thereby move the door window up and down. One of a plurality of mounting holes of the door inner panel for mounting the guide rail is a round hole formed as a reference hole which does not allow adjustment of mounting position of the guide rail, while the other mounting holes are oblong holes which allow the adjustment of mounting position of the guide rail, mounting holes of the sliding support member for mounting the door window are formed oblong to allow adjustment of mounting position of the door window, and a service hole is provided, in the door inner panel, for fastening the door window in an up stop position of the door window to the sliding support member.

2 Claims, 5 Drawing Sheets

STRUCTURE AND METHOD OF MOUNTING WINDOW REGULATOR

FIELD OF THE INVENTION

The present invention relates to a structure and method of mounting a window regulator which moves an automotive door window upwardly and downwardly.

BACKGROUND OF THE INVENTION

The window regulator is interposed between a door outer panel and a door inner panel of a door, and a guide member is secured to the door inner panel.

Therefore, the guide member and the door inner panel are provided with mounting holes for bolts and so forth in specific corresponding positions, so that the guide member may be supported with the corresponding mounting holes properly aligned with each other, and fastened with bolts inserted and tightened.

In this case, however, the door window must fit uniformly in a run channel provided along a door opening when the door window with the guide member thus fastened is actually raised to the up stop position.

The "up stop position" mentioned above is a position where the door window which opens and closes is raised to fully close.

Generally, therefore, component parts relating to the up-and-down movement of the door window such as the guide rail and so forth are assembled with their tightening positions set through lot management.

Particularly, an example of adjustment of the door window mounting position has been described in Japanese Utility Model Publication No. Sho 61-27295. In this example, formed in the door inner panel are a support section for supporting the guide rail member and an insertion hole for inserting a holding tool under the guide rail member thus supported. Parallelism of the upper edge of the door window to a sash is adjusted while the guide rail member is raised with a holding tool such as a driver, and in the most paralleled condition, the guide rail member is secured to the door inner panel.

The adoption of the lot management for setting the tightening position of component parts has such a disadvantage as an increased number of working processes and occurrence of variations in window fitting. According to the example given in the gazette stated above, the parallelism of the upper edge of the door window to the sash is adjusted not in the up stop position, but in a little lower position, and then the guide rail member is secured. This method depends upon visual measurement, which requires much time, and moreover it is not necessarily insured that, in the up stop position, the door window will come in uniform contact with the run channel and so forth to maintain a well-fitted condition.

SUMMARY OF THE INVENTION

In view of the above-described various disadvantages, it is an object of the present invention to provide a structure and method of mounting a well-fitted window regulator which can be assembled in decreased manhours.

To accomplish the above-described object, the present invention provides a structure for mounting a window regulator having a guide rail fixedly mounted by a plurality of bolts to a door inner panel, and a sliding support member which slides along the guide rail, supports a door window from below and is fastened to the door window by bolts to thereby move the door window up and down. In this structure for mounting the window regulator, one of a plurality of mounting holes of the door inner panel for mounting the guide rail is a round hole formed as a reference hole which does not allow adjustment of mounting position of the guide rail, while the other mounting holes are oblong holes which allow the adjustment of mounting position of the guide rail; mounting holes of the sliding support member for mounting the door window are oblong holes formed to allow the adjustment of mounting position of the door window; and a service hole is provided, in the door inner panel, for fastening the door window in an up stop position of the door window to the sliding support member.

Also, the present invention provides a method of mounting a window regulator having a guide rail fixedly mounted by a plurality of bolts to a door inner panel, and a sliding support member which slides along the guide rail, supports a door window from below and is fastened by bolts to the door window. This method comprises steps for temporarily tightening the guide rail to the door inner panel, rockably on a center of a reference mounting hole, supporting the door window on the sliding support member and then temporarily tightening the door window movably before and behind, raising the sliding support member to move the door window up to an up stop position of the door window, and securely tightening the guide rail temporarily tightened to the door inner panel as well as the door window temporarily tightened to the sliding support member.

Since one of the bolt mounting holes is a reference hole while the other mounting holes are oblong holes, the guide rail, when temporarily installed to the door inner panel by a plurality of bolts, is movable for positioning on the center of the reference hole relative to the door inner panel.

Furthermore, the door window, when temporarily bolted to the sliding support member, is movable for adjusting its position by the use of the oblong bolt holes of the sliding support member.

When the sliding support member is raised to move the door window up to the up stop position, with the guide rail temporarily tightened to allow movement for adjustment relative to the door inner panel and with the door window temporarily tightened to allow movement for adjustment relative to the sliding support member, the door window is automatically positioned, fitting uniformly in the frame of the door opening in the best-fitted position. In this state, the guide rail can be firmly tightened to the door inner panel and the door window also can be firmly tightened to the sliding support member by utilizing the service hole in the door inner panel.

Since the window regulator is automatically adjusted when the door window is moved to the up stop position, and securely tightened in the proper position, it can be fitted well with few working processes and manhours.

DETAILED DESCRIPTION OF THE PREFERRED EMBODIMENT

Hereinafter one embodiment of the present invention will be explained with reference to FIGS. 1 to 5.

Figure 1:
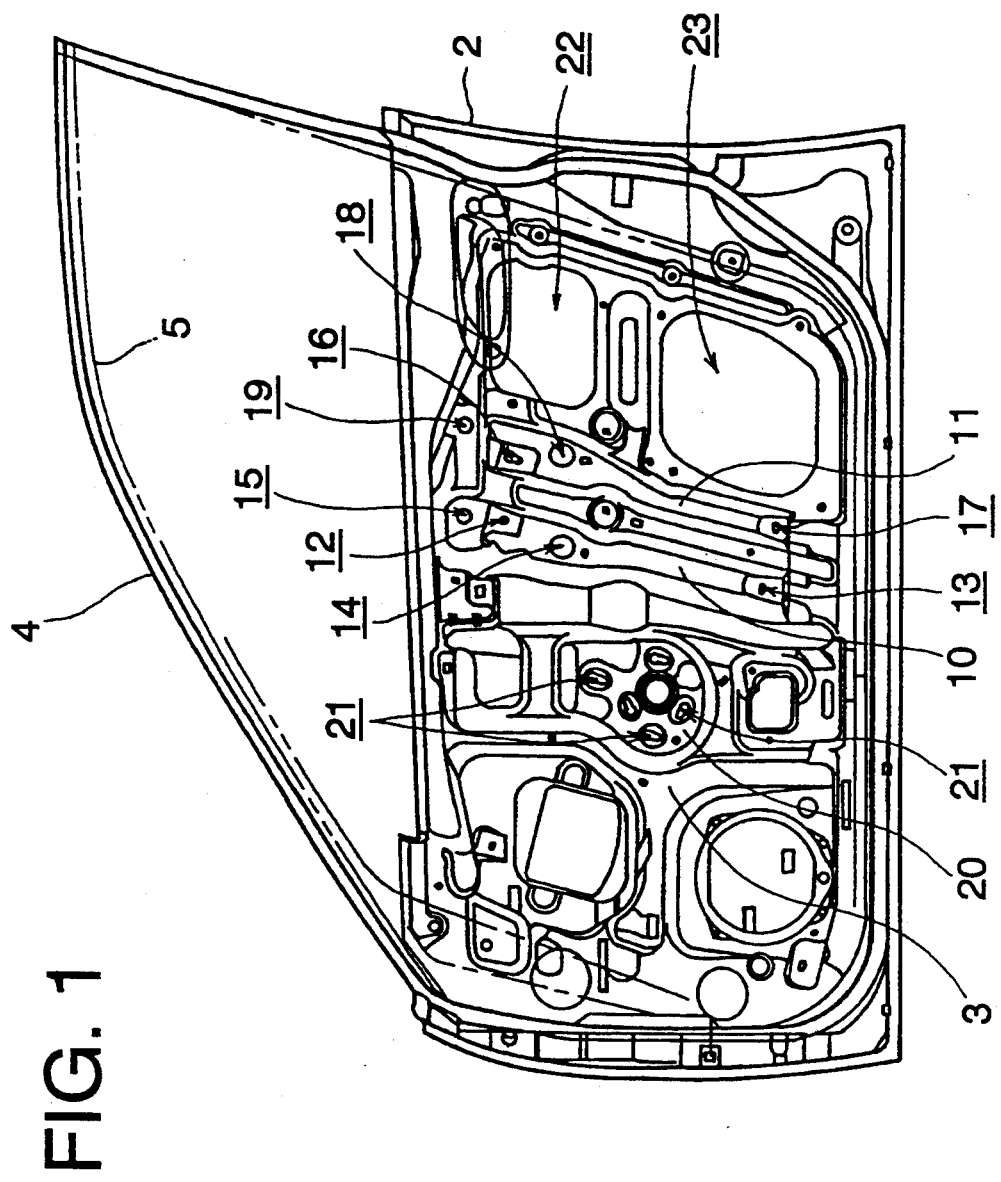
FIG. 1 is a partially omitted side view of a front door of one embodiment of the present invention.

FIG. 1 is a view showing the inside of a front door 1 of an automobile according to the present embodiment, that is, a side view of the door before installation of such parts as a door hole seal on the inboard side and door glass 25, the window regulator 30, and so forth.

Between a door outer panel 2 and a door inner panel 3 is formed a space, above which a window frame 4 is formed.

In the upper edges of the door outer panel 2 and the door inner panel 3 is formed a gap to allow the up-and-down movement of the door glass 25. In the inner periphery of the window frame 4 is provided a run channel 5 in which the peripheral edge of the door glass 25 contacts.

The door inner panel 3 is of a complicated shape for mounting various devices, of which a section necessary for the installation of the window regulator 30 will be explained by referring to FIG. 1.

Two long bulging portions 10 and 11, front and rear, are formed, approximately symmetrically, bulging on the inboard side and inclined slightly forwardly and downwardly from an upper part, a little behind the center of the door inner panel 3.

The upper end of the front long bulging portion 10 is partly depressed and in this depressed portion is provided a round reference hole 12, while the lower end also is partly depressed and in this depressed portion are provided oblong holes 13 at right and left.

Both the reference hole 12 and the oblong holes 13 are mounting holes for fixing a guide rail 31 of the window regulator 30.

The long bulging portion 10 has a nearly round service hole 14 provided in its upper half part, lower than the reference hole 12, and further a service hole 15 provided in a specific position above the reference hole 12.

Similarly the rear long bulging portion 11 is provided with mounting holes for mounting the guide rail 31 slightly below the reference hole 12 and the oblong hole 13; the upper mounting hole is an pear-shaped hole 16 formed by downwardly extending a part of a lower edge of a round hole, while the lower mounting hole is a oblong hole 17 prolonged right and left.

Below the pear-shaped hole 16 is provided a service hole 18 at about the same level as, and correspondingly to, the service hole 14, and also a service hole 19 is provided at about the same level as, and correspondingly to, the service hole 15 above the pear-shaped hole 16.

Furthermore, there is formed a bulging portion 20 for mounting the drive unit 51 with a part of a circular portion swelling upwardly, at a middle level ahead of the long bulging portion 10; and a plurality of mounting holes 21 are provided in the inner periphery.

The mounting hole 21 is of the same pear shape as the pear-shaped hole 16.

At the rear of the long bulging portion 11 of the door inner panel 3 are formed large square upper and lower openings 22 and 23, for various service operations. The lower opening 23 is made specially large for use in inserting the window regulator.

Subsequently, the window regulator 30 will be explained with reference to FIGS. 2 and 3.

The guide rail 31 disposed tilting aslant on the inside of the door inner panel 3 is a long member having an approximately U-shaped cross section. The guide rail 31 has guide walls 31a and 31b formed on both the front and rear sides as shown in FIG. 3, and is curved as swelling out slightly outwardly (toward the door outer panel 2 side) (see FIG. 4).

On a side surface of the guide rail 31 opposing the door inner panel 3 are fixedly attached upper and lower brackets 32 and 33 in specific positions.

The brackets 32 and 33 are of the same shape and are attached in the same attitude on the guide rail 31. To explain the bracket 32, the bracket 32 has a central portion 32a narrower than the width of the guide rail 31 and welded to the side surface of the guide rail 31. Both side portions 32b and 32c of the bracket 32 extend before and behind being raised from the central portion 32a.

The side portions 32b and 32c are provided with bolt mounting holes 32d and 32e, and nuts 34 and 35 are fixedly attached to the surface on the side of the guide rail 31, aligned with the mounting holes 32d and 32e.

The lower bracket 33 also is of a similar design.

On the opposite side with respect to the brackets 32 and 33 of the guide rail 31, a sliding support plate 40 is slidably engaged.

The sliding support plate 40 is a rectangular member which is long before and behind, and has upper and lower sides partly projecting slightly upward and downward respectively. At the upper and lower end portions are fitted sliding guide members 41 and 42 each having a vertical groove on the side of the guide rail 31, so that the sliding guide members may slidably fit at the groove on a rear guide wall 31b of the guide rail 31, thereby guiding the sliding support plate 40 up and down along the guide rail 31.

Vertical rectangular holes 40a and 40b are provided at front and rear inside the sliding support plate 40. In the rectangular holes 40a and 40b are fitted engaging members 43 and 44 which are bent into a U shape. The engaging members 43 and 44 hold the guide walls 31a and 31b of the guide rail 31 and the sliding support plate 40 from outside of the guide walls 31a and 31b, in order that the sliding support plate 40 can smoothly move up and down without being detached from the guide rail 31.

On the front and rear sides of the sliding support plate 40 oblong holes 45 and 46 which is long before and behind are provided for installing the door glass 25. And below these oblong holes 45 and 46 are provided U-shaped cuts to form support lugs 47 and 48 which are bent to the side opposite to the guide rail 31.

At about the center of the sliding support plate 40, a locking box section 49 for locking a wire 50 is provided adjacently to the engaging member 44, and bulging outwardly on the guide rail 31 side. Both ends of the wire 50 are inserted into this locking box section 49 from both above and below and locked.

Figure 4:
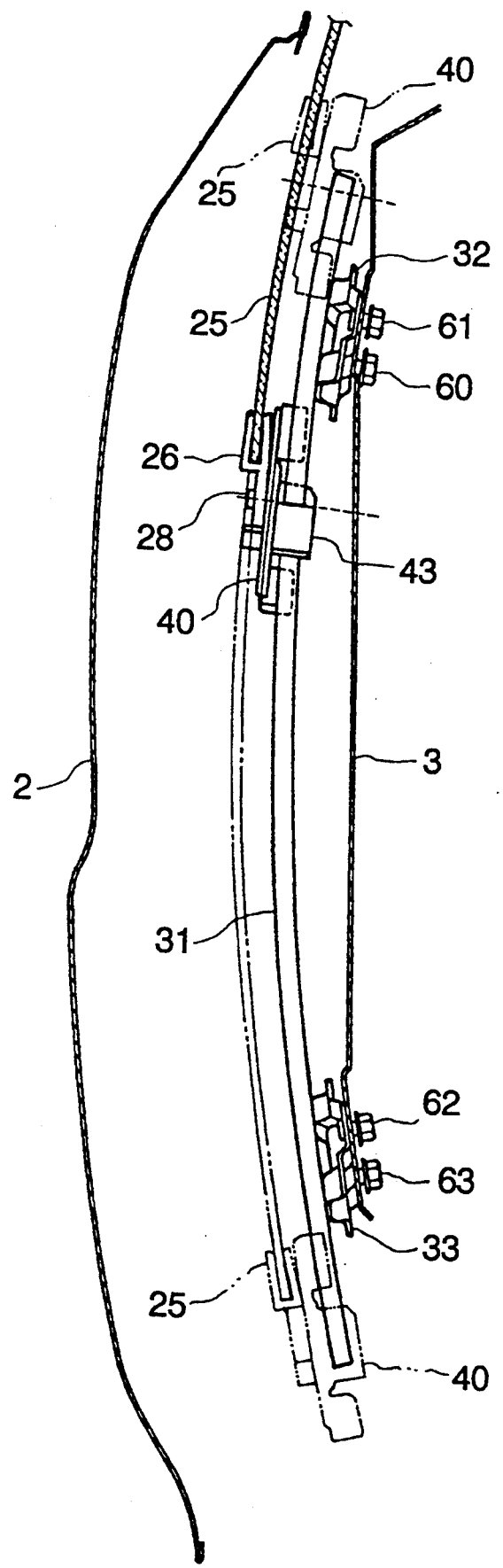
FIG. 4 is a longitudinal sectional view of the front door.

The door glass 25 has a lower side edge formed nearly horizontal and straight except for the rear portion which is slightly inclined. The other side edges of the door glass 25 are formed along the window frame 4, curved to swell slightly outwardly (FIG. 4). In specific positions at the front and rear of the lower side edge of the door glass 25 are fitted glass holders 26 and 27.

The glass holders 26 and 27 are provided, in the upper half part, with fitting grooves 26a and 27a respectively, for holding the lower side edge of the door glass 25 from right and left, and fit on the door glass through an elastic member. In the lower half part of the glass holders 26 and 27 are provided mounting holes, and nuts 28 and 29 are fixedly attached on the outer side being aligned with these mounting holes.

The glass holders 26 and 27 fitted on the lower side edge of the door glass 25 are supported on the front and rear support lugs 47 and 48 of the sliding support plate 40. The nuts 28 and 29 correspond to the front and rear oblong holes 45 and 46 of the sliding support plate 40.

In the meantime, the drive unit 51 for moving the sliding support plate 40 up and down through the wire 50 is disposed apart from the guide rail 31.

The drive unit 51 functions to wind one end portion of the wire 50 on a drive roll which is driven by a power window motor 52 while paying out the other end portion of the wire 50.

The two portions of the wire 50 extending from the drive unit 51 are branched off to front and rear at the top end of the guide rail 310 being led downwardly along the inside surface of the guide walls 31a and 31b. One branch of the wire 50 extending downwardly along the rear guide wall 31b is locked at the end directly by the locking box section 49, while the other branch of the wire 50 further extending downwardly along the front guide wall 31a changes its direction upwardly at the bottom end of the guide rail 31, and then goes upwardly along the rear guide wall 31b, where the end of the wire is locked by the locking box section 49.

The normal and reverse rotation of the power window motor 52 is transmitted to the sliding support plate 40 through the wire 50 thus installed, thereby enabling the upward and downward movement of the sliding support plate 40.

The drive unit 51 also is interposed between the door outer panel 2 and the door inner panel 3 of the front door 1, and secured to the door inner panel 3. A plurality of bolt holes 54 facing the door inner panel 3 are provided on the drive unit 51.

Hereinafter the procedure for mounting the window regulator 30 to the door inner panel 3 will be explained in order.

First, a flange bolt 60 is inserted into the rear mounting hole 32e of the bracket 32 located on the upper part of the guide rail 31, with only its tip end portion engaged with the nut 35 and left projecting out.

In a plurality of bolt holes 54 of the drive unit 51 also, flange bolts 70 are inserted for engagement only at the tip end portion.

Figure 2:
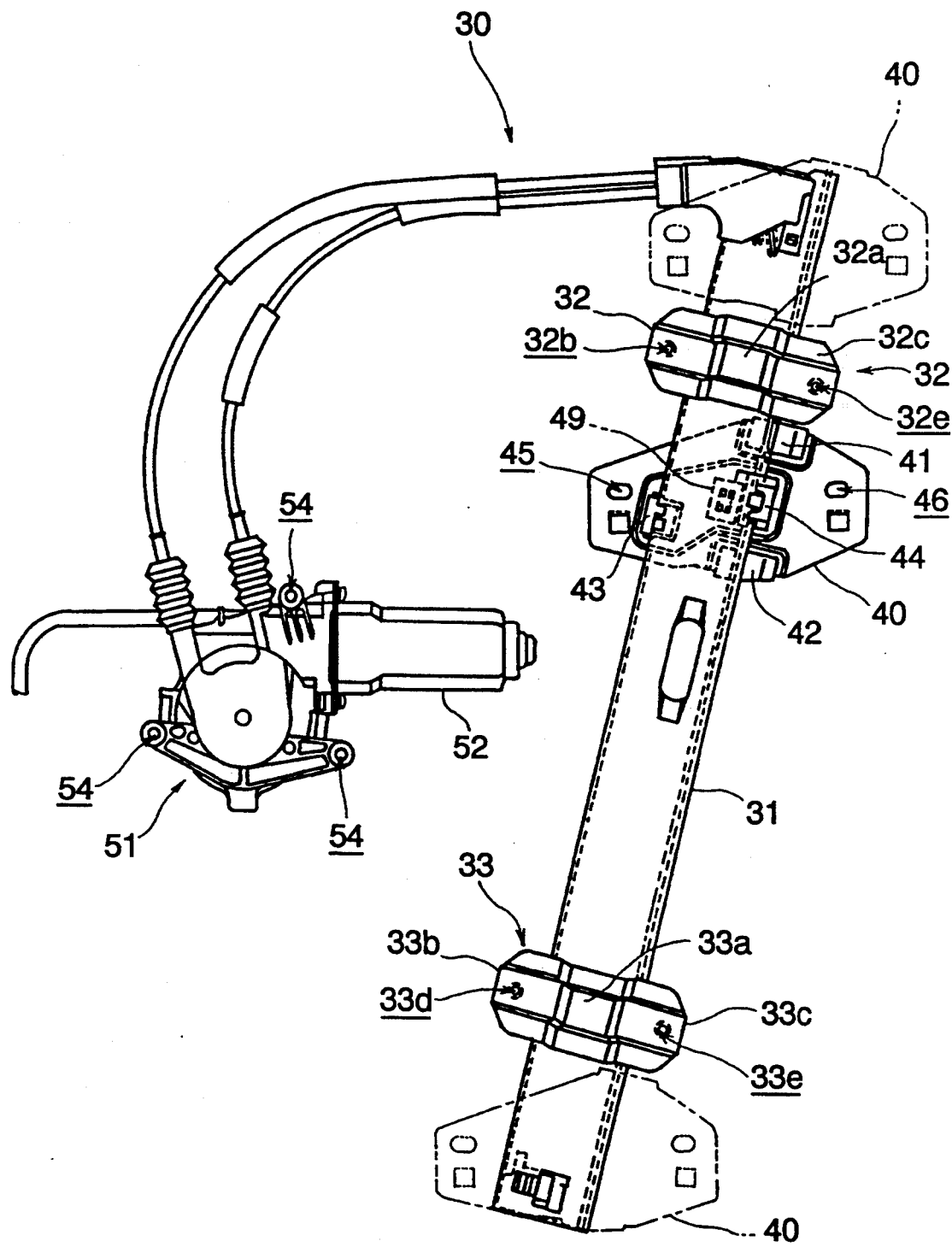
FIG. 2 is a general side view of a window regulator of the present embodiment.
Figure 3:
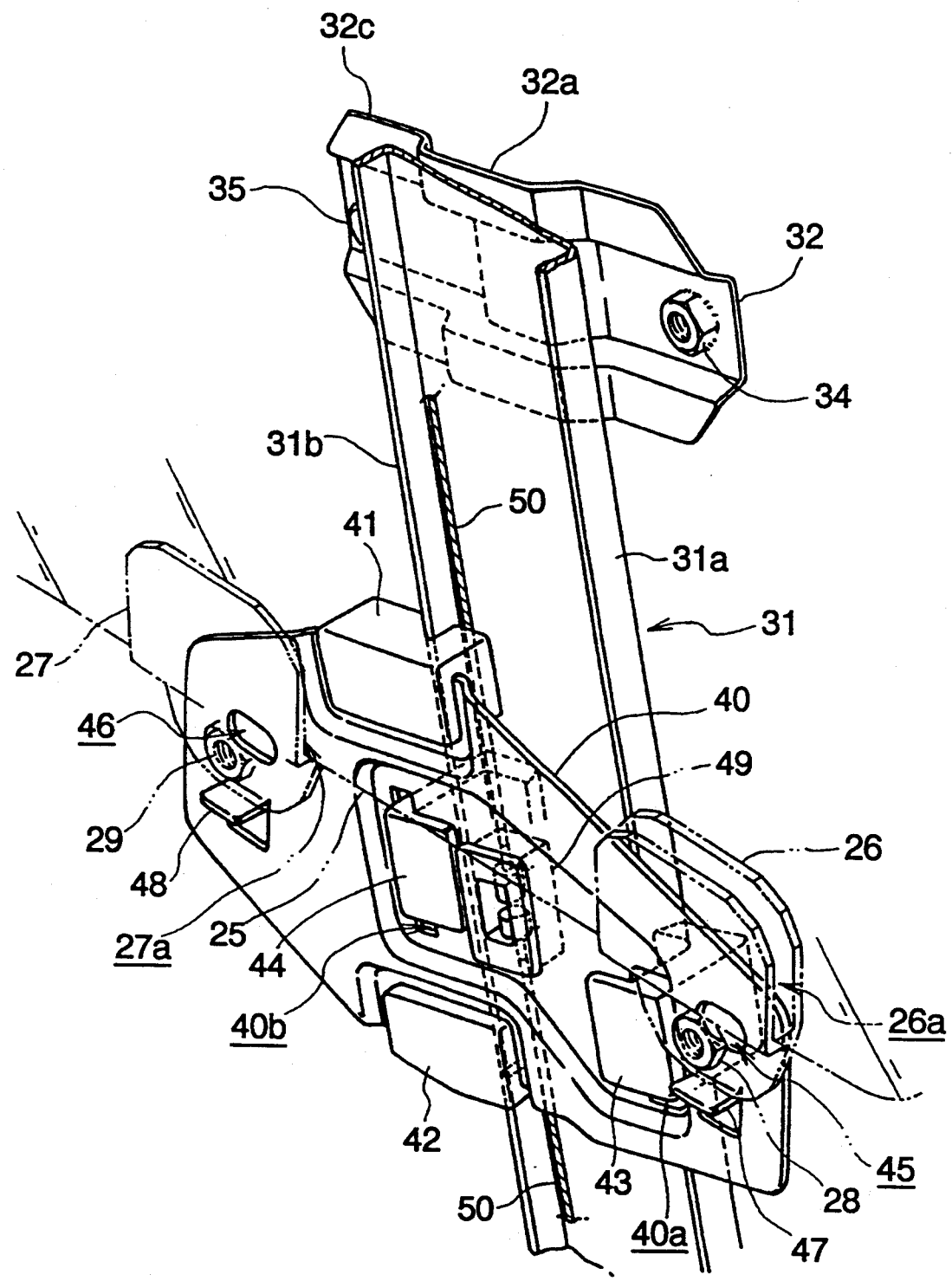
FIG. 3 is a perspective view of a major portion of the window regulator.

Next, the sliding support plate 40 is set at a specific level of the guide rail 31 shown in FIGS. 2 and 4, and in this state the window regulator 30 is inserted into the large opening 23 of the door inner panel 3. Then, with the drive unit 51 placed first in the position of the bulging portion 20, the plurality of flange bolts 70 partly engaged with the bolt holes 54 in advance are inserted into the pear-shaped mounting holes 21 through the large-diameter opening portion thereof, and turned a little into engagement with the small-diameter opening portion, thereby supporting the drive unit 51 firmly.

Next, with the guide rail 31 held along the long bulging portions 10 and 11 of the door inner panel 3, the flange bolt 60 previously partly engaged with the upper bracket 32 is also inserted into the pear-shaped hole 16 on the door inner panel 3 side through the large-diameter opening portion thereof and lowered a little into engagement, thereby supporting the guide rail 31 at a single point.

Since the guide rail 31 is supported at a single point by the flange bolt 60, it is possible to easily align the other mounting holes 32d, 33d and 33e of the brackets 32 and 33 with the oblong holes 12, 13 and 17 on the door inner panel 3 side by rocking the guide rail 31 around the flange bolt 60, and then to insert flange bolts 61, 62 and 63 through into engagement with the nut 34 on the inner side, thereby enabling temporarily tightening the guide rail 31.

At this time, the front and rear oblong holes 45 and 46 of the sliding support plate 40 are aligned with the service holes 14 and 18 of the door inner panel 3 respectively.

In the meantime, the drive unit 51 is mounted by firmly tightening a plurality of flange bolts 70 to the door inner panel 3.

This firm tightening of the drive unit 51 may be done prior to the temporary tightening of the guide rail 31.

Subsequently, when the door glass 25 fitted with the glass holders 26 and 27 on the lower side edge is inserted through a gap between the top ends of the door outer panel 2 and the door inner panel 3 until the glass holders 26 and 27 are supported on the front and rear support lugs 47 and 48 of the sliding support plate 40, the nuts 28 and 29 of the glass holders 26 and 27 are properly aligned with the oblong holes 45 and 46 of the sliding support plate 40, corresponding to the front and rear service holes 14 and 18 on the door inner panel 3 side. Flange bolts 64 and 65 are inserted through the oblong holes 45 and 46 into engagement with the nuts 28 and 29 by utilizing the service holes 14 and 18, thus being temporarily tightened.

Figure 5:
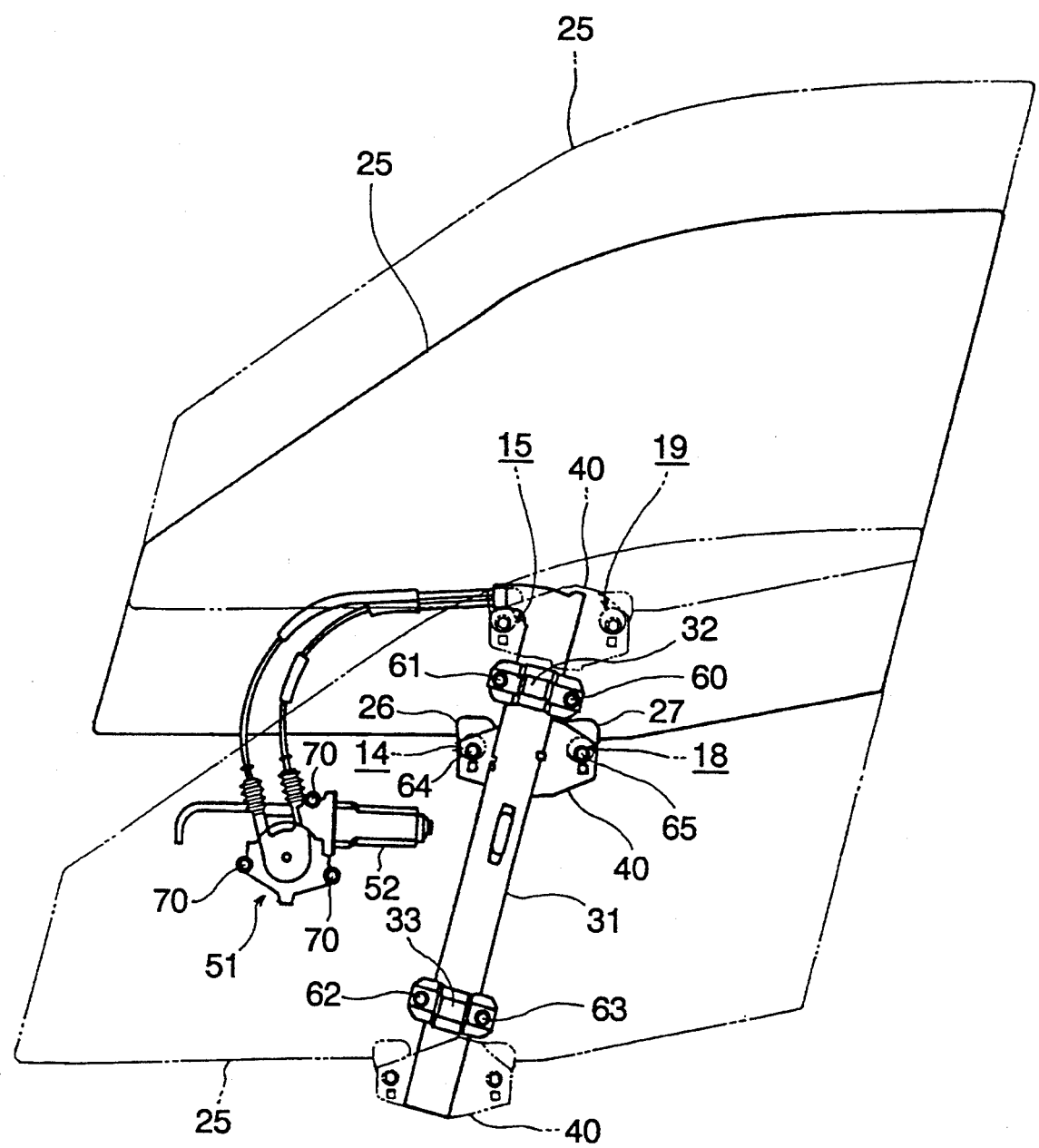
FIG. 5 is a side view of the window regulator and the door glass in temporarily tightened condition.

In FIG. 5 the window regulator 30 and the door glass 25 in this condition are indicated with a solid line.

In this temporarily tightened condition, the guide rail 31 is somewhat rockable on the center of the flange bolt 61 which is engaged with the reference hole 12 tightened temporarily, and the door glass 25 is movable before and behind with respect to the sliding support plate 40.

At this stage, when the power window motor 52 is operated to move the sliding support plate 40 upwardly, the door glass 25 temporarily fastened to the sliding support plate 40 moves upwardly until the peripheral edge of the door glass 25 contacts the run channel 5 of the window frame 4. Thus the door glass 25 somewhat freely movable in the temporarily tightened condition is automatically adjusted in posture to uniformly fitting in the run channel 5 in the best fitting condition.

At this time, the flange bolts 64 and 65 thus temporarily tightened to the sliding support plate 40 face the service holes 15 and 19 located in the upper part of the door inner panel 3. The flange bolts 64 and 65 are firmly tightened by utilizing these service holes 15 and 19 to secure the door glass 25 to the sliding support plate 40, and the three flange bolts 61, 62 and 63 of the guide rail 31 similarly temporarily tightened are firmly tightened to secure the guide rail 31 to the door inner panel 3, thus completing the installation of the window regulator 30 to the door inner panel 3.

As heretofore described, the guide rail 31 is temporarily tightened rockably by the flange bolt 61 inserted through in the reference hole 12 and other flange bolts 60, 62 and 63; and the door glass 25 is temporarily tightened movably before and behind by inserting the flange bolts 64 and 65 through into the oblong holes 45 and 46, so that the door glass 25, in the freely movable condition, will be automatically adjustable to the best-fitted attitude in the up stop position, thereby enabling the reduction of work processes and hours and the realization of the best fitting of the door window.

In the present embodiment, the reference hole 12 of the door inner panel 3 is located in the top end position of the long bulging portion 10, but any one hole at the other three positions for fixing the guide rail 31 may be used as the reference hole.

However, the position of the top end of the long bulging portion 10 is located closest to the center of gravity when the door glass 25 is mounted to the sliding support plate 40 of the guide rail 31, and is the optimum, well-balanced position in the temporarily tightened condition.

The pear-shaped hole 16 is also located in a well-balanced position when the guide rail 31 is first attached by the flange bolt 60.

What is claimed is:

1. A structure for mounting a window regulator having a guide rail fixedly mounted by a plurality of bolts to a door inner panel, and a sliding support member which slides along said guide rail, supports a door window from below and is fastened to said door window by bolts to thereby move said door window up and down, characterized in that one of a plurality of mounting holes of said door inner panel for mounting said guide rail is a round hole formed as a reference hole which does not allow adjustment of mounting position of said guide rail, while the other mounting holes are oblong holes which allow the adjustment of mounting position of said guide rail; mounting holes of said sliding support member for mounting said door window are formed oblong to allow adjustment of mounting position of said door window; and a service hole is provided, in said door inner panel, for fastening said door window in an up stop position of said door window to said sliding support member.

2. A method of mounting a window regulator having a guide rail fixedly mounted by a plurality of bolts to a door inner panel, and a sliding support member which slides along said guide rail, supports a door window from below and is fastened by bolts to said door window, comprising steps for temporarily tightening said guide rail to said door inner panel rockably on a center of a reference mounting hole; supporting said door window on said sliding support member and then temporarily tightening said door window movably before and behind to said sliding support member; raising said sliding support member to move said door window up to an up stop position of said door window; and securely tightening said guide rail temporarily tightened to said door inner panel as well as said door window temporarily tightened to said sliding support member.

* * * * *